US006973486B2

(12) United States Patent
Blakeney

(10) Patent No.: US 6,973,486 B2
(45) Date of Patent: Dec. 6, 2005

(54) ALTERNATE SERVER SYSTEM

(76) Inventor: Kenneth M. Blakeney, 7855 Deer Springs Way, Suite #2129, Las Vegas, NV (US) 89131

( * ) Notice: Subject to any disclaimer, the term of this patent is extended or adjusted under 35 U.S.C. 154(b) by 0 days.

(21) Appl. No.: 10/751,950

(22) Filed: Jan. 7, 2004

(65) Prior Publication Data
US 2004/0153757 A1 Aug. 5, 2004

Related U.S. Application Data

(60) Provisional application No. 60/443,846, filed on Jan. 31, 2003.

(51) Int. Cl.[7] ............................ G06F 17/30; H02H 3/05
(52) U.S. Cl. ...................... 709/220; 709/223; 709/225; 709/239; 707/10; 714/25
(58) Field of Search ................... 714/13, 25; 709/220, 709/225, 223, 239; 707/10; 700/19, 20

(56) References Cited

U.S. PATENT DOCUMENTS

| 5,852,724 | A | 12/1998 | Glenn, II et al. | ........ 395/200.69 |
| 6,134,673 | A | 10/2000 | Chrabaszcz | ................... 714/13 |
| 6,195,760 | B1 | 2/2001 | Chung et al. | ................... 714/4 |
| 6,363,497 | B1 * | 3/2002 | Chrabaszcz | ................... 714/13 |
| 6,611,923 | B1 * | 8/2003 | Mutalik et al. | ................. 714/4 |
| 6,629,110 | B2 * | 9/2003 | Cane et al. | ................. 707/204 |

* cited by examiner

Primary Examiner—Khanh Dinh
(74) Attorney, Agent, or Firm—Richard C. Litman

(57) ABSTRACT

An alternate server system for continued network operation in the event of a network server failure. The alternate server system integrates a number of main servers with a backup server and a number of workstations. The backup server periodically takes snapshots of selected application data sets on the main server. In the event of a main server failure, the backup server gives users of the workstations the option to continue running applications on the backup server using the selected backup data. When the main server is returned to operation, the alternate server system discontinues execution of applications on the backup server, updates modified data, and restarts the applications on the main server.

6 Claims, 4 Drawing Sheets

ALTERNATE SERVER SYSTEM

CROSS-REFERENCE TO RELATED APPLICATION

This application claims the benefit of U.S. Provisional Patent Application Ser. No. 60/443,846, filed Jan. 31, 2003.

FIELD OF THE INVENTION

The present invention relates generally to computerized systems and methods for enterprise data and applications management, and in particular to a system of daemons for providing a backup framework capable of running critical applications when the primary server or servers in a network are down.

DESCRIPTION OF RELATED ART

Today it is a common business practice to have a networked client/server computer system. These systems typically have one or more main servers, which run a set of services or applications, which are accessible by a network. Users of the system access the applications and related data through any number of terminals and/or workstations connected to the network. This type of system allows for a plurality of users to operate applications based on a single or relatively small number of main servers.

The abovementioned system is not without its drawbacks, however. If a main server goes down, the users of the connected terminals and/or workstations will be prevented from accessing the applications and/or data contained therein or controlled by the primary server. In some situations the availability of applications and/or data is critical, and even a single hour of downtime may result in the loss of millions of dollars.

One way of preventing downtime is to set up an asymmetrical server arrangement. This typically requires that each main server have a backup server ready to assume application operations in the case of a failure. With servers being one of the most expensive pieces of a network, and with the backup servers being idle for most of their operational life, many inventors have looked for a way to reduce the need for a backup server for each main server. The following patents teach several approaches to overcoming this issue.

U.S. Pat. No. 5,852,724 issued to Glenn, II et al. on Dec. 22, 1998, discloses a system and a method for multiple primary servers to fail over to one secondary server. A set of primary servers and a secondary server are connected by a set of public networks and a private network. Each server has a unique private network node name. However, the whole primary server set and the secondary server have a common node name by which their services are addressable over public networks. When a failure of a primary server gets detected over the private network, the secondary server activates a duplicate set of the lost services and takes over servicing the public network in the position of the failed server. The common node name allows the secondary server to offer duplicated services for several failed primary servers.

U.S. Pat. No. 6,134,673 issued to Chrabaszcz on Oct. 17, 2000, discloses a method for clustering software applications. The method involves a networked computing environment running specially designed software. This software can detect the failure of a server. The software, in cooperation with a fully replicated database, which maintains configuration data about registered applications, can remap an application to a specified secondary server to continue execution. The remapping occurs transparently to users of the application.

The present invention differs from what is taught in the '724 and '673 inventions in several particulars. The system and method of the present invention do not require any specialized hardware configuration or a specific software environment to detect server failures. The present invention is autonomous and uses its own agents to detect failures. The present invention also does not assume the existence of a redundant, hard-to-fail storage subsystem as part of the supported system. The assumption of the existence of such a subsystem greatly simplifies the problem of losing a server due to failure, since in these prior art systems the backup server can immediately address this storage subsystem and continue to provide the services of the failed server. Instead, in the present invention, the system offers selective replication of data to an alternate storage subsystem so that vital data remains available even when the primary storage subsystem fails. Furthermore, the present invention is simpler in concept in that it does not automatically switch over to backup services. Instead, after detecting server failure, the present invention prompts the user for action and offers the user recovery options.

U.S. Pat. No. 6,195,760 issued to Chung et al. on Feb. 27, 2001, discloses a method and apparatus for providing failure detection and recovery with a predetermined degree of replication for distributed applications in a network. The '760 invention uses checkpointing to periodically store the state of running application modules on stable storage. Daemons watch over running modules for failure. Upon failure, a central controller affects a fail-over procedure dependent on the replication style to restore access to lost services.

The '760 invention differs from the present invention in that the present invention does not require the use of special code libraries to enable communication between an application module and the system components. The Chung invention requires full access to the source code of an application to perform linking with the special code libraries, which ordinarily are not available to users of commercial applications. The system and method of the present invention does not require such access to the source code of the various applications running on the network.

None of the above inventions and patents, taken either singly or in combination, is seen to describe the present invention as claimed. Thus an alternate server system solving the aforementioned problems is desired.

SUMMARY OF THE INVENTION

The invention is an alternate server system for continued network operation in the event of a network server failure. The alternate server system integrates a number of main servers with a backup server and a number of workstations. The backup server periodically takes snapshots of selected application data sets on the main server. In the event of a main server failure, the backup server gives users of the workstations the option to continue running applications on the backup server using the selected backup data. When the main server is returned to operation, the alternate server system discontinues execution of applications on the backup server, updates modified data, and restarts the applications on the main server.

Accordingly, it is a principal object of the invention to provide an alternate server system capable of enabling the continued operation of a networked computer system when one or more of the main servers fail.

It is another object of the invention to provide an alternate server system that allows for the manual switching of the alternate server system from a failed main server to a backup server for network service.

It is a further object of the invention to provide an alternate server system that is capable of updating the data maintained by a main server with information saved on a backup server upon recovery of the main server.

It is an object of the invention to provide improved elements and arrangements thereof in an apparatus for the purposes described which are inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
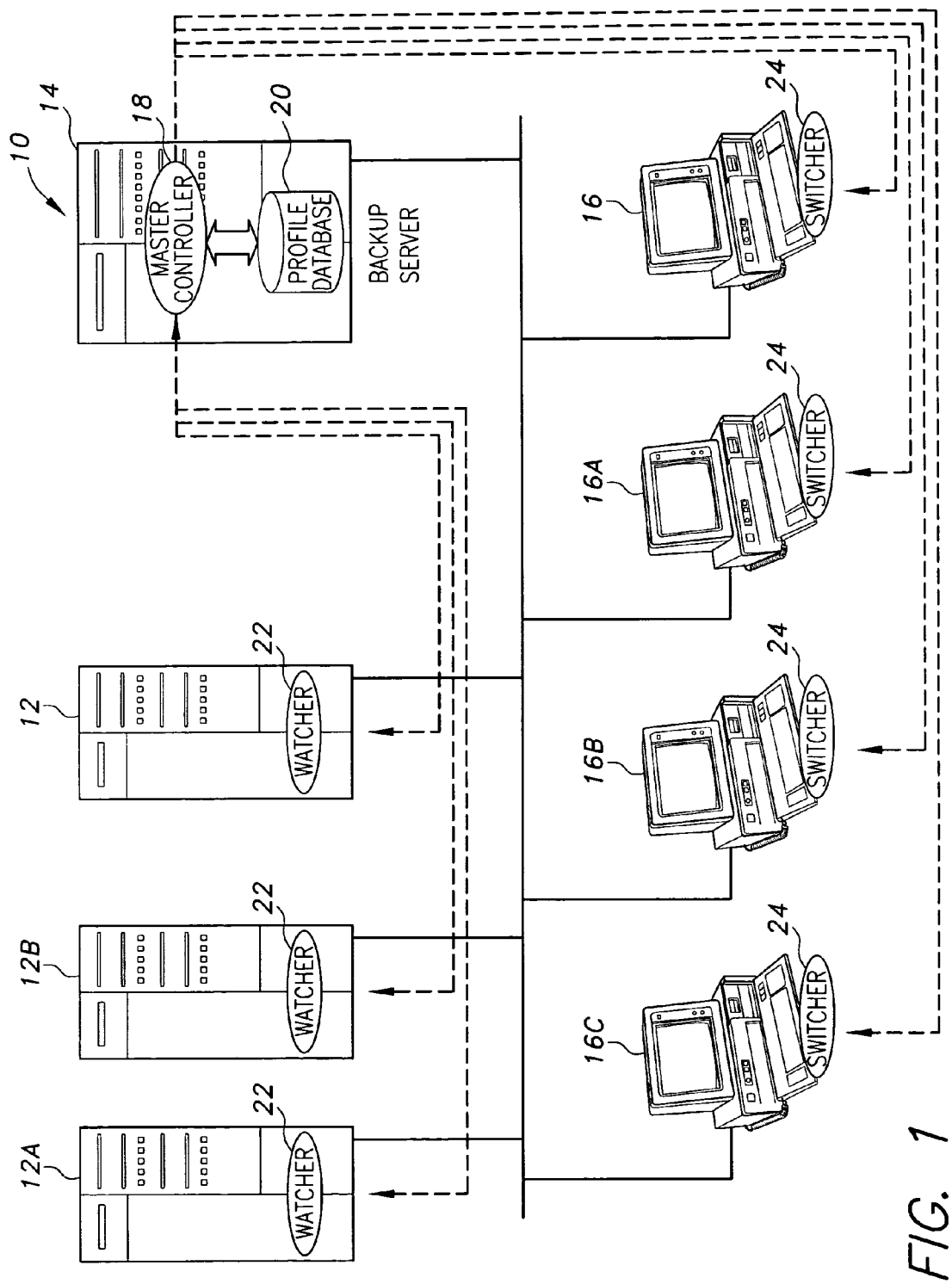
FIG. 1 is a block diagram of a network having an alternate server system according to the present invention.

The alternate server system 10, as diagrammatically depicted in FIG. 1, operates within a network environment having at least one main server 12, a backup server 14 and at least one workstation 16. Any number of main servers 12A, 12B and workstations 16A, 16B, and 16C may also be incorporated into the alternate server system 10, with several being shown for representation purposes. The following description is not limited to any particular number of main servers 12 or workstations 16. It is possible for the backup server 14 to be physically located on the main server 12, but this configuration is not recommended. The main server 12 ordinarily contains application program code and application data.

Figure 2:
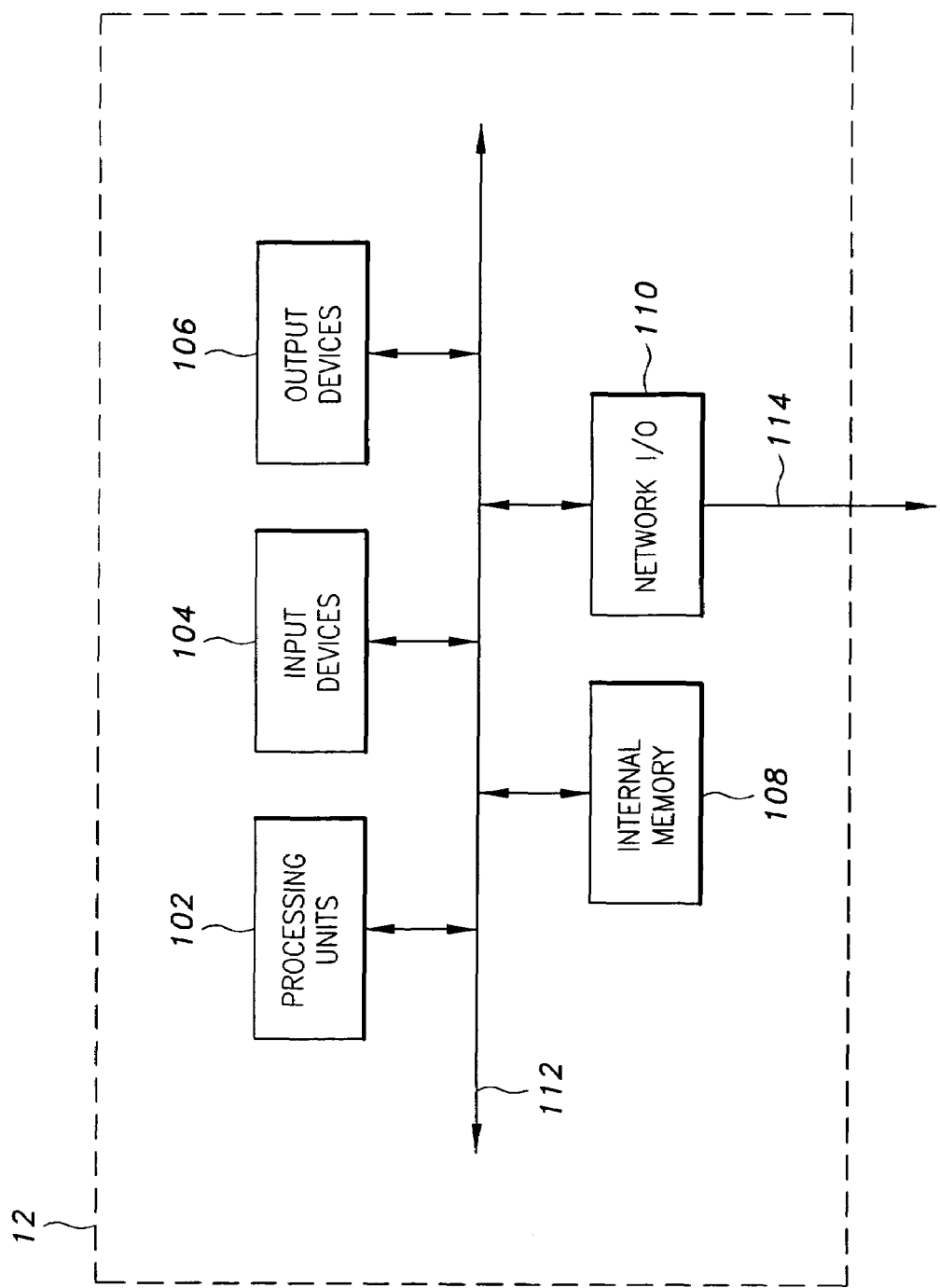
FIG. 2 is a block diagram depicting the configuration of a server in an alternate server system according to the present invention, the configuration of a workstation in the network being identical.

FIG. 2 is a block diagram illustrating a preferred embodiment of the main servers 12, 12A, and 12B shown in FIG. 1. Each main server 12 has similar internal components, so that only one main server 12 will be discussed. The main server 12 preferably is comprised of one or more processing units 102, input devices 104, interface output devices 106, an internal memory 108, and a network input/output 110, each coupled via an internal bus 112. Elements 102, 104, 106, 110, and 112 are conventionally known. The internal memory 108, however, contains program instructions stored thereon, which are not conventionally known.

The internal memory 108 stores a set of computer readable program instructions for controlling how the processing unit accesses, transforms and outputs data, as described below in FIGS. 3A and 3B. Those skilled in the art will recognize that in alternate embodiments the internal memory 108 could be supplemented with any number of computer readable media, including a compact disk, a hard drive, a memory card or an Internet site. The workstations 16, 16A, 16B, and 16C as shown in FIG. 1 preferably are similarly configured to the main server 12 shown in FIG. 2.

The alternate server system 10 comprises a set of cooperating daemon (background) programs running on the backup server 14, the main server 12, and the workstations 16. The backup server 14 is the host of a master controller daemon 18 (discussed in detail below), an application profile database 20, as well as the necessary application code to run independent applications selected by the user. The application profile database 20 contains information about which subsets of application data are to be periodically refreshed, as described below. A watcher daemon 22 is present on the main servers 12, 12A, and 12B, and a switcher daemon 24 is present on each workstation 16. As used herein, a "daemon" refers to a program associated with UNIX systems that performs a housekeeping or maintenance utility function without being called by the user. A daemon sits in the background and is activated only when needed, for example, to correct an error from which another program cannot recover. All of the above mentioned daemons are discussed in detail below.

A common duty for both the watcher daemons 22 and the switcher daemons 24 is to monitor the condition of the machine upon which each one runs, and to report that condition to the master controller daemon 18. This allows the master controller daemon 18 to have a view of the overall "health" of the computing system.

There is one watcher daemon 22 per main server 12. A single main server 12 will be addressed for simplicity. The watcher daemon 22 coordinates with the master controller daemon 18 and the application profile database 20 for taking data snapshots and sending the snapshots to backup storage on the backup server 14. The watcher daemon 22 preferably includes at least three modules, a monitor, a data collector, and a data restorer (all not shown).

Figure 3A:
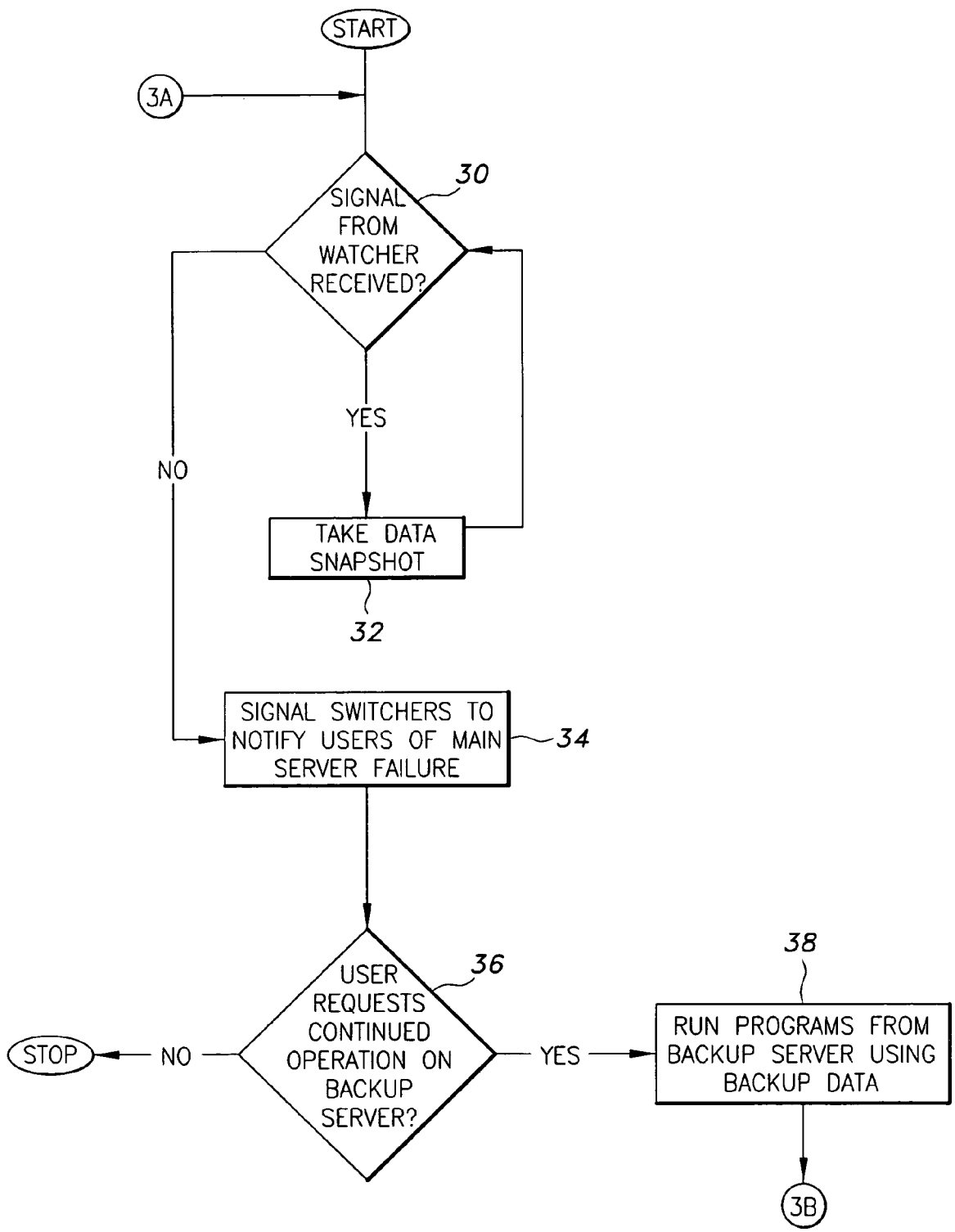
FIGS. 3A and 3B make up a flow chart depicting the operation of an alternate server according to the present invention.

FIG. 3A illustrates the steps involved in monitoring the main server 12. The monitor module of the watcher daemon 22 emits periodic status signals to the master controller daemon 18 at predetermined time intervals. The signal from the watcher daemon 30 received indicates to the master controller daemon 18 that the main server 12 is functioning normally. If the main server 12 is functioning normally the data collector module of the watcher daemon 22 will take snapshots 32, i.e., copy and transmit to the backup server 14, and a predetermined subset of the data present on the main server 12. This subset typically has information that is vital for the continued operation of the alternate server system 10. For example, in a database application the snapshot would include important portions of an application profile database 20 relating to a specific set of users, or in a word processing application, the snapshot would include recently modified/created files and files necessary for the continued operation of a business. The exact amount and type of information that will be copied is set according to the needs of the alternate server system 10 user, and is part of the profile of an application stored in the application profile database 20 present on the backup server 14.

If the signal from the watcher daemon 22 is not timely received by the master controller daemon 18, or if the signal indicates problems with the main server 12, the master controller daemon 18 will signal switcher daemons 24 to notify users of the main server failure 34 and then give these users the option to continue operations using the backup server 14 and the selected data stored there.

If the user requests continued operation on the backup server 36 to run one or more of the supported recoverable applications on the backup server 14, the backup server 14 will begin running programs using backup data 38 that has been selectively stored on the backup server's 14 storage. The programs will continue to execute on the backup server 14 until the master controller daemon 18 receives a signal from the watcher daemon 22 (which will restart once the main server 12 recovers) that the main server 12 is functioning normal.

Figure 3B:
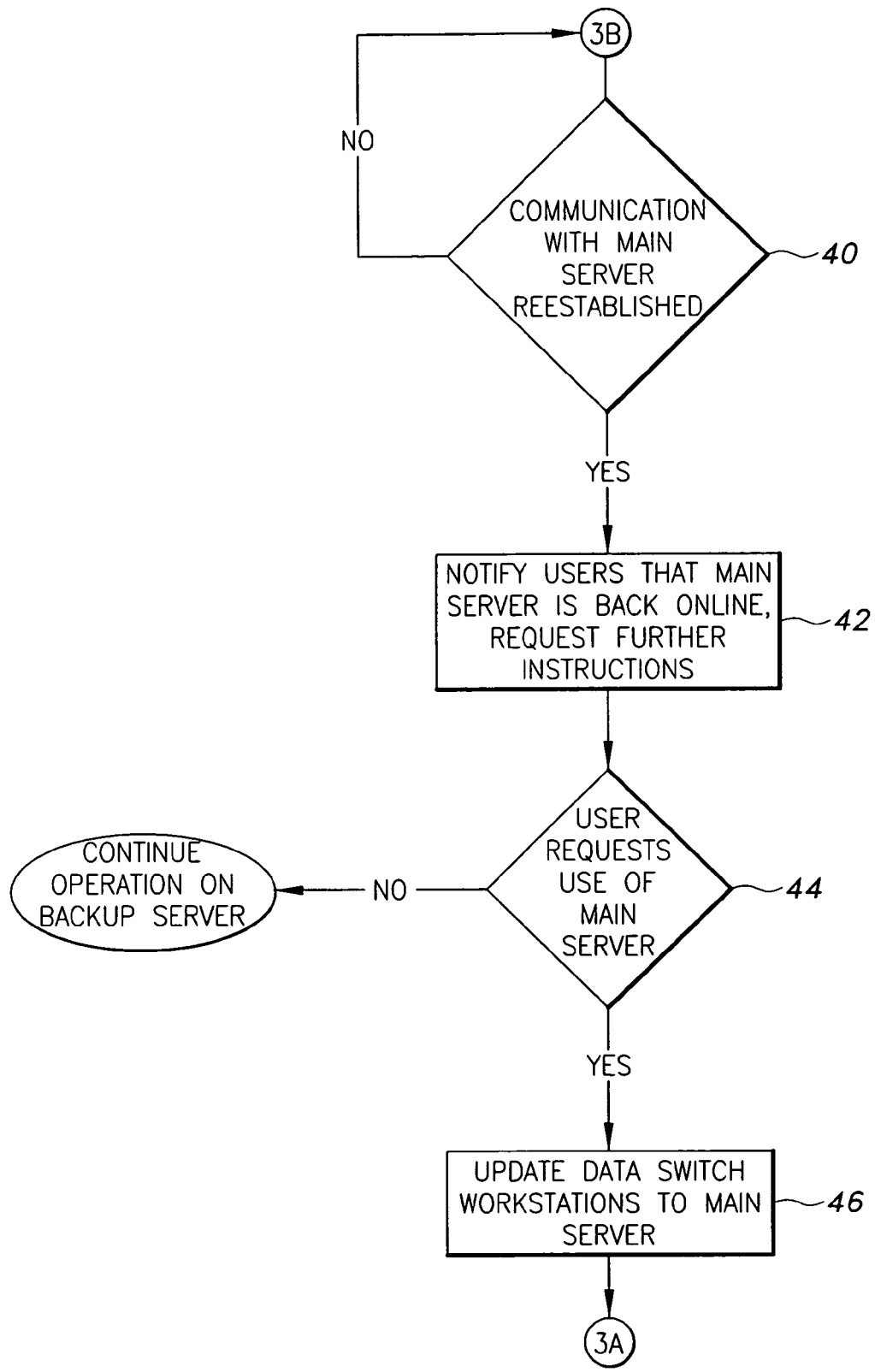

FIG. 3B illustrates the process whereby the operations of the workstations 16 may be switched back to the main server 12. First, communication with the main server is reestablished 40 with the master controller daemon 18. At that point the master controller daemon 18 notifies users that the main server is back online and requests further instructions 42 from the switcher daemons 24 to notify the users of the workstations 16 that the main server 12 is online and awaits user approval to resume operations on the main server 12. The switcher daemon 24 found on each workstation 16 monitors the condition of the workstation 16 and reports this information back to the master controller daemon 18. In this way the master controller daemon 18 is able to determine which workstations 16, 16A, 16B, and 16C can and/or need to be addressed when recovering an application.

If the user requests use of the main server 44, the master controller daemon 18 interfaces with the watcher daemon 22 on the main server 12 and updates data switch workstations to the main server 46 and then restarts the applications previously providing services to the workstations 16, 16A, 16B, and 16C. The master controller daemon 18 then resumes monitoring the signals from the watcher daemon 22 and stores the snapshot data in the application profile database 20. These steps are then repeated as deemed necessary.

Due to the configuration of the alternate server system 10, a laptop or notebook computer (not shown) may also be used in an alternate server system 10. By using a battery-powered router/transmitter (not shown) and laptop or notebook computers as workstations 16, a computer network may continue to function even during a complete power outage.

Many organizations utilize networked computer systems. Such systems include one or more main servers 12 connected to a plurality of remote workstations 16 through a network. These remote workstations 16 share application and data located on the main server(s) 12. The present invention is an alternate server system 10 that allows the workstations 16 to continue to execute applications and access vital data when there is a main server 12 failure.

The alternate server system 10 utilizes one or more main servers 12 containing the necessary code for executing critical applications, and also the corresponding critical data, for at least a specified minimum level of operations. The alternate server system 10 utilizes cooperating daemons to monitor programs operating on a main server(s) 12 or workstation(s) 16. If the main server(s) 12 or workstation(s) 16 fail, the alternate server system 10 facilitates the restoration of the failed applications to a working state as close as possible to the state the applications were in at the moment of failure. Upon restoration of the operation of the failed main server(s) 12 or workstation(s) 16, the alternate server system 10 restores and updates the data sets on the failed main server(s) 12 or workstation(s) 16 so that the applications can have full access to all data, including data entered and created during operation on backup.

It is to be understood that the present invention is not limited to the sole embodiment described above, but encompasses any and all embodiments within the scope of the following claims.

I claim:

1. An alternate server system operating within a network environment, comprising:
   at least one main server;
   a backup server including a master controlling daemon, an application profile database and application code to run independent applications;
   at least one workstation;
   a set of cooperating daemon running on each one of the at least one main server, and each one of the at least one workstation; wherein said master controlling daemon monitors a status of each one of said set of cooperating daemon on each of said at least one main server and said at least one workstation so as to alert users of potential failure of any one of said at least one main server, and initiates a command to maintain program operations via said backup server; and
   wherein a watcher daemon at said at least one main server coordinates with the master controller daemon and the application profile database for periodically taking data snapshots and sending the data snapshots to a backup storage on said backup server;
   wherein said backup server maintains operations of running programs with no data and application losses, and instantaneously reestablishes the operations of the running programs based on a most recent snapshot upon a main server failure, such that when a signal from the watcher daemon is not timely received by the master controller daemon to indicate problems with the main server, the master controller daemon signals a switcher daemon at said at least one workstation to notify the users of the main server failure, and allows the users to continue operations using said backup server based on selected stored data.

2. The server system according to claim 1, wherein each one of the at least one main server further comprises one or more processing units, input devices, interface output devices, an internal memory coupled by an internal bus and a watcher daemon.

3. The server system according to claim 1, wherein each one of the at least one workstation further comprises a switcher daemon.

4. The server system according to claim 3, wherein a battery-powered router/transmitter and laptop and notebook computer is used as a workstation.

5. The server system according to claim 2, wherein each one of watcher daemons and switcher daemons monitor conditions of each respective machine upon which they run and report the respective conditions thereof to the master controller daemon.

6. The server system according to claim 5, wherein the watcher daemons further comprise a monitor module, a data collector module, and a data restorer module.

* * * * *